United States Patent [19]
Hayes

[11] 3,751,816
[45] Aug. 14, 1973

[54] GUIDE FOR HAND-HELD ELECTRIC SAW

[76] Inventor: George W. Hayes, 15032 Regina, Allen Park, Mich. 48101

[22] Filed: June 7, 1971

[21] Appl. No.: 150,295

[52] U.S. Cl.................. 33/185 R, 33/112, 83/471.2
[51] Int. Cl............................................... B27g 19/04
[58] Field of Search................. 33/285, 286, 174 Q, 33/171, 202, 185, 112; 143/6 G, 88

[56] References Cited
UNITED STATES PATENTS

| | | | |
|---|---|---|---|
| 1,960,590 | 5/1934 | McKay.............................. | 143/6 G |
| 3,320,982 | 5/1967 | Kwiatkowski....................... | 143/6 G |

*Primary Examiner*—Louis R. Prince
*Assistant Examiner*—Jon W. Henry
*Attorney*—Allan J. Murray

[57] ABSTRACT

A guide formed with a guide face elongated parallel to a line of proposed cut, and provided with a squaring member projecting from said guide transversely to said face to engage a surface of a workpiece. A saw cut indicator projecting transversely to said guide face in the direction opposite from said squaring member, and terminating in a saw cut indicating edge predeterminedly spaced from and parallel to said guide face, said saw cut indicator being made of a material of some permanence, but readily cut by a saw blade, so that on an initial cut using a specific electric saw, the blade will permanently establish the saw cut indicator edge for that particular saw. Screws threadedly received in said squaring member and adjustable to establish angular divergency between said squaring member and the surface of a workpiece engaged thereby and consequently a corresponding divergency of a saw cut.

1 Claim, 3 Drawing Figures

PATENTED AUG 14 1973 3,751,816

INVENTOR
GEORGE W. HAYES

BY Allan J. Murray
ATTORNEY

GUIDE FOR HAND-HELD ELECTRIC SAW

There are no other applications pending by the inventor with respect to this invention, and no patents issued thereon.

FIELD OF INVENTION

Invention is believed to lie in, and the objects of the invention are, the provision of a saw guide assembly having a saw cut indicator member which may be readily cut by the blade of a hand saw to permanently establish the spacing for a particular saw, of the saw cut indicator edge parallel to a guide face elongated in the direction of cut on a guide member.

A further object of the invention is to provide a squaring element threadedly receiving screws, or the like, to afford flexibility in the use of the device by establishing, where desired, angular divergencies between the squaring element and the surface of a workpiece engaged by said squaring element.

Still a further object is to provide an inexpensive, light-weight saw guide which may be held by one hand while a saw to be guided thereby is manipulated with the other hand of the user.

These and various other objects are attained by the construction hereinafter described and illustrated in the accompanying drawing, wherein.

Figure 1:
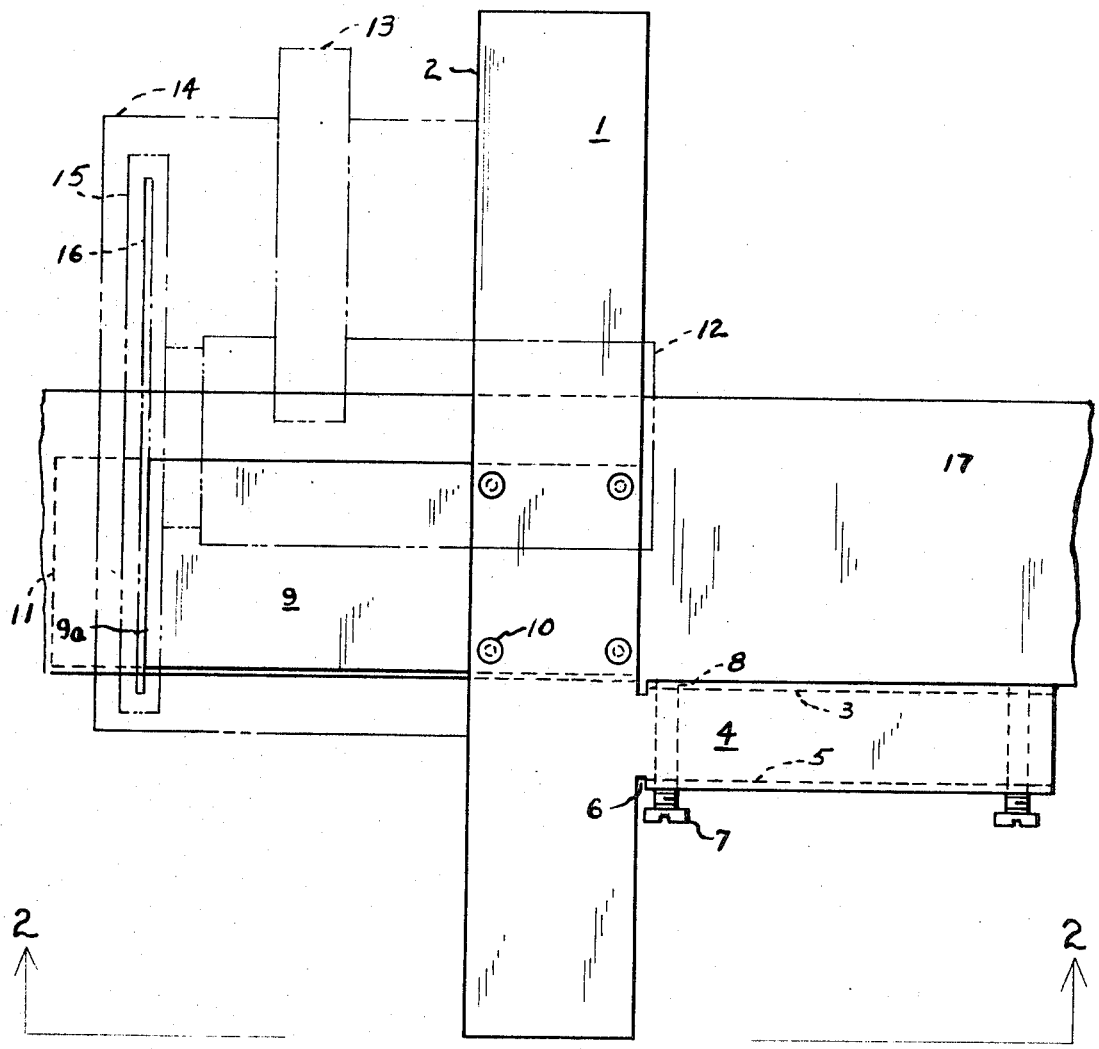
FIG. 1 is a top plan view of the improved saw guide assembly.

In these views the reference character 1 designates a guide member, having a saw guiding face 2 elongated parallel to the line of proposed saw cut. Projecting integrally from the guide member 1 is a squaring element, comprising a first flange 3, joined by a horizontal span 4 to a second flange 5, spaced fom said first flange. It may be desired to form notches 6 at the junction of the squaring member with the saw guide to facilitate formation of the flanges. One or more screws 7 are threadedly received in the second flange 5, and the first flange 3 is apertured as at 8 to pass the end portions of said screws.

Figure 2:
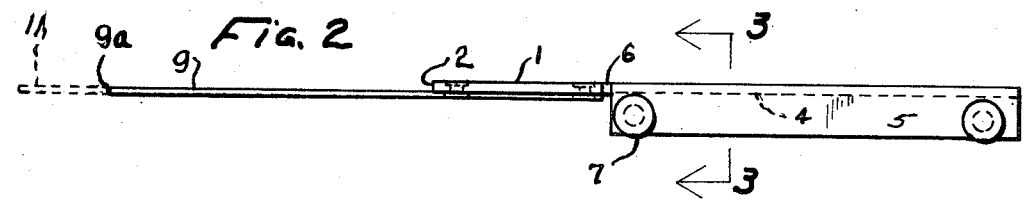
FIG. 2 is a side elevational view of said saw guide assembly taken on line 2—2 of FIG. 1.
Figure 3:
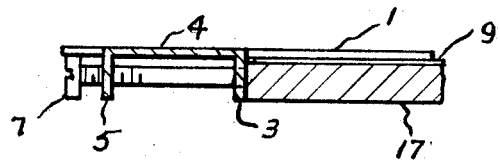
FIG. 3 is a vertical, elevational, sectional view taken on line 3—3 of FIG. 2.

A saw cut indicator 9 has one end portion secured to and beneath the guide member 1, in any conventional manner, as by rivets 10. Where rivets are used it is desirable that the bottom faces thereof be flush with the under surface of the saw cut indicator. Shown in dash line in FIGS. 1 and 2 is a proposed cutoff portion 11 of the saw cut indicator, the reason for which is explained hereinafter.

An electrical circular hand-guided saw is indicated in phantom line, the saw motor being designated as 12, and provided with a handle 13. The edge of a foot which supports the saw and motor as it moves over a workpiece bears against the saw guide face 1 to direct the saw in a rectilinear cut. The foot 14 is formed with an elongated rectangular slot 15 through which the circular saw blade 16 is enabled to engage a workpiece 17 for purposes of making a cut.

Much time can be saved, and great accuracy ensured, by use of the saw cut indicator 9. It is proposed in manufacture of the assembly to provide excess length on said saw cut indicator so that the saw with which the guide is intended to be used may, on its first pass, cut the saw guide indicator, and leave an indicator edge 9a. Thus, thereafter, whenever that particular saw is used with the saw guide indicator, it can be predetermined where the saw cut will be made relative to the saw guide face. Where a line or mark is made on a workpiece, as is common practice, the saw cut indicator may be accurately positioned on the workpiece relative to such line, with assurance that the edge 9a of the saw cut indicator 9 will then coincide with the rear face of the saw blade, thus establishing the precise line of cutoff on a workpiece. It is proposed to employ a material substantially thinner than drawn to afford as nearly as possible a uniform under surface to the assembly. The thickness shown for the indicator 9 is exaggerated for visual convenience.

It is, or course, proposed to make the saw cut indicator of some material such as aluminum, of a suitable durability, which may, however, be readily cut by a saw blade without damage to the blade.

What I claim is:

1. A guide assembly for a held-held electric saw, including,
    a saw guide to surmount a workpiece to be cut,
    a rectilinear guide face elongated on said guide,
    a squaring element projecting in one direction from said guide transversely to said guide face to engage the surface of a workpiece and position said guide face for a desired cut,
    said squaring element including a first flange engageable with a surface of a workpiece,
    a second flange parallel to and spaced from said first flange,
    one or more screws threadedly received in said second flange for rotatable adjustment therein and having terminal engagement with the surface of a workpiece to establish angular divergency between said first flange and such surface of a workpiece, and said first flange being adapted to afford said terminal engagement.

* * * * *